June 2, 1925. 1,539,897
J. F. DALE ET AL
KITCHEN RANGE
Filed Oct. 19, 1922 2 Sheets-Sheet 1
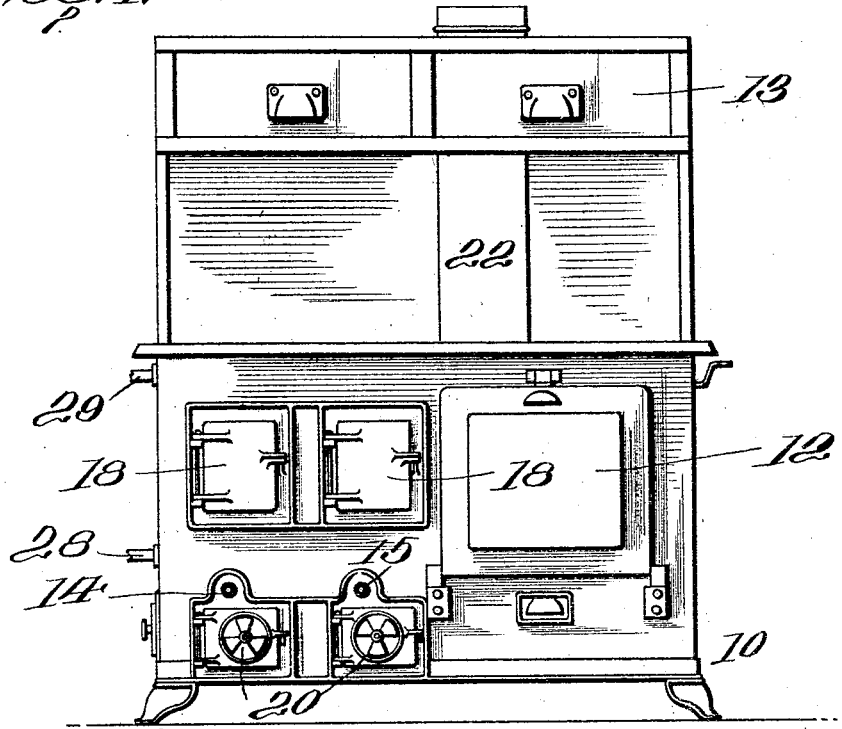
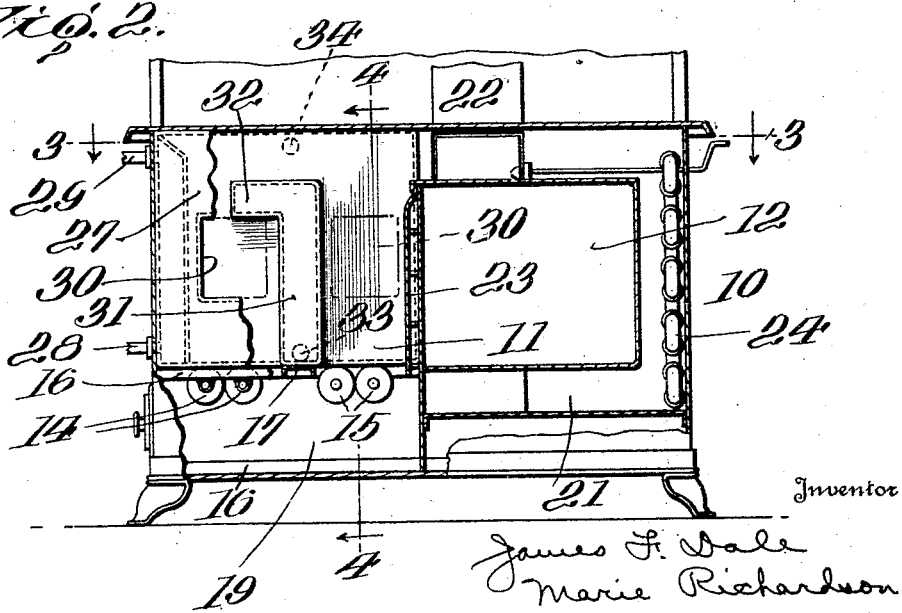
Inventor
James F. Dale
Marie Richardson
By Wm. S. Hodges Attorney June 2, 1925. 1,539,897
J. F. DALE ET AL
KITCHEN RANGE
Filed Oct. 19, 1922 2 Sheets-Sheet 2
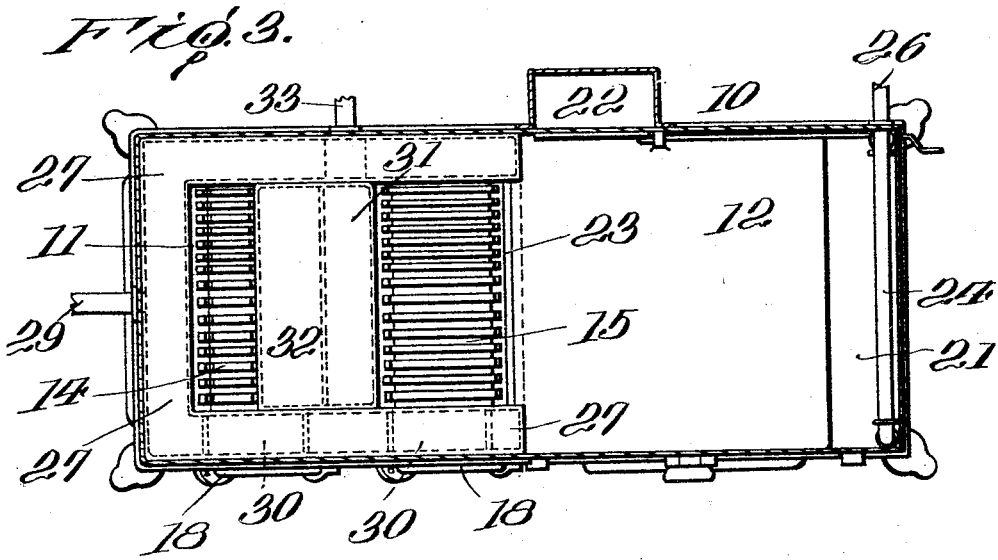
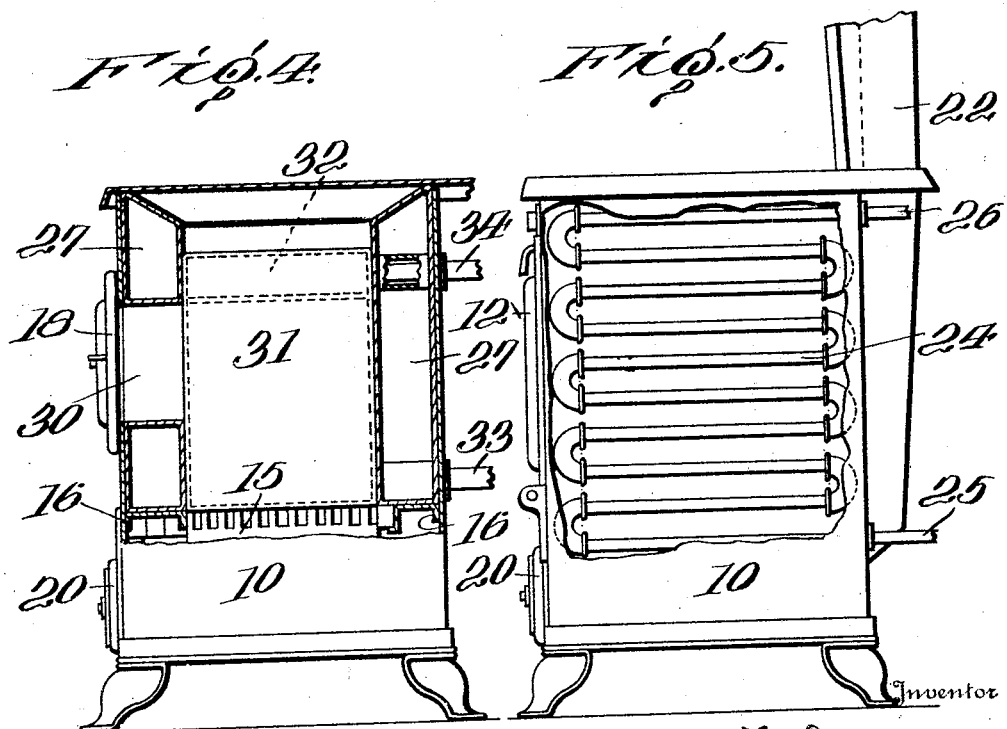

Patented June 2, 1925.

1,539,897

UNITED STATES PATENT OFFICE.

JAMES F. DALE, OF CHATTANOOGA, AND MARIE RICHARDSON, OF MEMPHIS, TENNESSEE.

KITCHEN RANGE.

Application filed October 19, 1922. Serial No. 595,582.

*To all whom it may concern:*

Be it known that we, JAMES F. DALE and MARIE RICHARDSON, citizens of the United States, residing, respectively, at Chattanooga, in the county of Hamilton, and Memphis, in the county of Shelby, both in the State of Tennessee, have invented a new and useful Kitchen Range, of which the following is a specification.

This invention is a water-heating apparatus for stoves of the kitchen range type.

One of the objects of the invention is to provide a kitchen range, so constructed that the heat radiated into the kitchen may be reduced to a minimum, and the heat within the fire box utilized to maintain water at a temperature sufficiently high for house heating and other similar purposes. A further object is to provide a kitchen range with a water jacket, so disposed as to partially enclose the fire box, and having openings through which fuel may be introduced into the fire box. A further object is to provide a kitchen range of the character mentioned, provided with a main water jacket and a removable supplemental water jacket positioned to divide the fire box into two parts.

The invention will be hereinafter fully set forth and particularly pointed out in the claims.

In the accompanying drawings:—

Figure 1 is a front elevation illustrating a kitchen range constructed in accordance with the invention. Figure 2 is a similar view with parts broken away. Figure 3 is a horizontal sectional view on the line 3—3, Figure 2. Figure 4 is a transverse sectional view on the line 4—4, Figure 2. Figure 5 is an end view with parts broken away.

Referring to the drawings, 10 designates a standard type kitchen range provided with the fire box 11, oven 12 and the usual warming oven 13. The fire box is provided with two sets of oscillatory grates 14, 15, supported by bars 16 extending beneath the fire box. Said grates are separated by a stationary grate 17. The fire box is provided with doors 18 through which fuel may be introduced, and the ash-pit 19 is provided with doors 20 through which the ashes may be removed, the last mentioned doors being provided with dampers to control the draft.

The usual heating flue 21 passes around the oven 12, and leads to the stack 22, and the oven is protected on the fire box side by a plate 23. Located within the flue 21 is a coil of pipe 24, having an inlet nipple 25 and an outlet nipple 26, said coil being designed to heat water for any desired purpose.

Located within the fire box above the grate 17, and covering the front, rear and one end thereof, is a water jacket 27. Said water jacket is provided with a water inlet pipe 28 and an outlet pipe 29. Extending through the front wall of said water jacket are openings 30, which coincide with the doors 18, thereby permitting the unimpeded introduction of fuel to the grates. By this arrangement a maximum heating surface for water is provided without interfering with the normal functions of the range.

Located within the fire box, and resting upon the stationary grate 17 is a supplemental water jacket 31, provided with a portion 32 overhanging the grate 14. Said supplemental water jacket is provided with a water inlet nipple 33 and a water outlet nipple 34, which extend through clearance spaces formed in the rear wall of the water jacket 27. The arrangement is such that the supplemental water jacket 31 may be removed without disturbing the main water jacket 27, ample clearance being provided for the passage of the nipples 33 and 34, during such removal.

In practice, the two water jackets 27 and 31 are preferably placed in position, and fire is started upon the grates 14 and 15 in the usual and well-known way, the necessary fuel being introduced through the doors 18 and the openings 30. It will be readily understood that the heat generated in the fire box raises the temperature of the water within both water jackets, and a circulation is thus provided. The water in the main jacket 27 may be connected with a suitable radiator system, not shown, and the water in the supplemental jacket 31 may be connected either with a domestic boiler or with a radiator system, not shown. Likewise the coil 24 may be connected either with a domestic boiler, or with a heating system as may be desired. In view of the fact that the specific forms of heating systems form no part of the invention it is not considered necessary to illustrate them.

The advantages of the invention will be readily apparent. By disposing the water jacket 27 around three sides of the fire box, radiation of heat into the kitchen is greatly reduced, and at the same time a maximum heating surface is provided which may be utilized to maintain water at a temperature sufficiently high for house heating purposes. By providing the water jacket 27 with the openings 30, it is possible to utilize the front portion of the fire box for water-heating purposes without interfering with the introduction of fuel. By means of the supplemental water jacket, additional hot water may be provided if desired, or if not required said supplemental jacket may be removed without in any way impairing the functions of the fire box. It will be particularly noted that by placing the water jacket 31 in position to divide the fire box into two parts, a large heating surface is provided, which surface is increased by the overhanging portion.

Having thus explained the nature of the invention and described an operative manner of constructing and using the same, although without attempting to set forth all of the forms in which it may be made, or all of the forms of its use, what is claimed is:—

1. A stove of the character described comprising a casing provided with a fire box, doors through which fuel may be introduced into said fire box, a water jacket covering a plurality of sides of said fire box and having openings coinciding with said doors, and a supplemental water jacket located between spaced apart portions of the first mentioned water jacket, said supplemental jacket being removably supported independently of the first water jacket and having an overhanging portion.

2. A stove of the character described comprising a casing provided with a fire box, two sets of spaced apart grate bars located in the fire box, doors through which fuel may be introduced into said fire box, a water jacket covering a plurality of sides of said fire box and having openings coinciding with the doors, a supplemental water jacket located between the sets of grate bars and having an angularly disposed portion overhanging one of said sets of grate bars.

3. A stove of the character described comprising a casing provided with a fire box, two sets of spaced apart grate bars located within the fire box, a water jacket located between the sets of grate bars and dividing said fire box into two portions, said water jacket having a top portion overhanging one of said sets of grate bars.

4. A stove of the character described comprising a casing provided with a fire box, two spaced apart sets of rocking grate bars, a set of stationary grate bars located between the sets of rocking grate bars, a water jacket resting upon the stationary grate and dividing the fire box into two portions, said water jacket having a top portion overhanging one of said sets of rocking grate bars, said water jacket being removably supported so that all of said sets of grate bars may be conjunctively used when the water jacket is removed.

In testimony whereof we have hereunto set our hands.

JAMES F. DALE.
MARIE RICHARDSON.